(12) United States Patent
Salvaryan

(10) Patent No.: US 12,345,241 B2
(45) Date of Patent: Jul. 1, 2025

(54) REGENERATIVE ENERGY SYSTEM USING DIRECT KINETIC ENERGY TRANSFER TO A GENERATOR

(71) Applicant: Ashot Salvaryan, Sun Valley, CA (US)

(72) Inventor: Ashot Salvaryan, Sun Valley, CA (US)

(*) Notice: Subject to any disclaimer, the term of this patent is extended or adjusted under 35 U.S.C. 154(b) by 32 days.

(21) Appl. No.: 17/902,743

(22) Filed: Sep. 2, 2022

(65) Prior Publication Data
US 2022/0412328 A1    Dec. 29, 2022

Related U.S. Application Data

(63) Continuation-in-part of application No. 17/521,816, filed on Nov. 8, 2021, now abandoned.

(60) Provisional application No. 63/282,608, filed on Nov. 23, 2021, provisional application No. 63/110,849, filed on Nov. 6, 2020.

(51) Int. Cl.
*F03G 7/08* (2006.01)

(52) U.S. Cl.
CPC .......... *F03G 7/081* (2021.08); *F05B 2220/60* (2013.01); *F05B 2240/941* (2013.01); *F05B 2260/42* (2013.01); *F05B 2260/503* (2013.01)

(58) Field of Classification Search
CPC .................. F03G 7/081; F05B 2220/60; F05B 2240/941; F05B 2260/42; F05B 2260/503
See application file for complete search history.

(56) References Cited

U.S. PATENT DOCUMENTS

| | | |
|---|---|---|
| 5,801,475 A | 9/1998 | Kimura |
| 6,930,848 B1 | 8/2005 | Codilian et al. |
| 6,984,902 B1 | 1/2006 | Huang et al. |
| 7,293,621 B2 | 11/2007 | Long |
| 7,554,224 B2 | 6/2009 | Roberts |
| 7,982,439 B2 | 7/2011 | Trainor et al. |
| 7,999,402 B2 | 8/2011 | Freeland et al. |
| 8,030,826 B2 | 10/2011 | Lee |
| 8,253,281 B2 | 8/2012 | Namuduri et al. |
| 8,283,795 B2 | 10/2012 | Khoury et al. |
| 8,376,100 B2 | 2/2013 | Avadhany et al. |
| 8,446,022 B2 | 5/2013 | Jiang et al. |
| 8,546,964 B2 | 10/2013 | Yang |

(Continued)

FOREIGN PATENT DOCUMENTS

| | | |
|---|---|---|
| CN | 112172519 | 1/2021 |
| CN | 112297744 A | 2/2021 |

(Continued)

*Primary Examiner* — Joseph Ortega
(74) *Attorney, Agent, or Firm* — MORRISS O'BRYANT COMPAGNI CANNON, PLLC

(57) ABSTRACT

The present invention is a system and method for recovering the kinetic energy created by movement of a vehicle frame relative to a vehicle suspension to generate electrical energy that may be utilized on-the-fly or stored in order to provide power to an electric vehicle, wherein an embodiment for a regenerative energy system uses a plurality of gear assemblies to convert linear up-and-down movement of the vehicle to rotary motion that is then amplified in rotational speed by a gear reduction system to cause rotational movement of a shaft of one or more generators in a single rotational direction to thereby generate electricity that may be utilized directly by electrical motors or stored in batteries or supercapacitors.

16 Claims, 13 Drawing Sheets

(56) References Cited

U.S. PATENT DOCUMENTS

| | | | |
|---|---|---|---|
| 8,874,291 | B2 | 10/2014 | Gresser |
| 8,941,251 | B2 | 1/2015 | Zuo et al. |
| 9,024,509 | B2 | 5/2015 | Mukter-Uz-Zaman et al. |
| 9,484,773 | B2 | 11/2016 | Miyanaga et al. |
| 9,871,472 | B2 | 1/2018 | Jia et al. |
| 11,577,606 | B1 * | 2/2023 | Macaluso ................ F03G 7/08 |
| 2001/0008191 | A1 | 7/2001 | Smith et al. |
| 2002/0153178 | A1 | 10/2002 | Limonius |
| 2003/0034697 | A1 | 2/2003 | Goldner et al. |
| 2005/0253486 | A1 | 11/2005 | Schmidt |
| 2010/0006362 | A1 | 1/2010 | Armstrong |
| 2010/0244457 | A1 | 9/2010 | Bhat et al. |
| 2011/0181132 | A1 | 7/2011 | Stefanini et al. |
| 2012/0292915 | A1 | 11/2012 | Moon |
| 2013/0062999 | A1 | 3/2013 | Muker-Uz-Zaman et al. |
| 2013/0088020 | A1 | 4/2013 | Rao |
| 2013/0140882 | A1 | 6/2013 | Agnew |
| 2015/0364974 | A1 | 12/2015 | Koch et al. |
| 2019/0052213 | A1 | 2/2019 | Brier et al. |
| 2020/0290462 | A1 * | 9/2020 | Broadbent ................ H02P 3/14 |
| 2022/0149699 | A1 | 5/2022 | Salvaryan |

FOREIGN PATENT DOCUMENTS

| | | | |
|---|---|---|---|
| CN | 113525075 | A | 10/2021 |
| JP | 5312156 | B2 | 10/2013 |
| WO | 21206584 | | 10/2021 |

\* cited by examiner

REGENERATIVE ENERGY SYSTEM USING DIRECT KINETIC ENERGY TRANSFER TO A GENERATOR

BACKGROUND

Field of the Invention

This invention relates generally to power regeneration systems. More specifically, the invention pertains to a system for reclaiming kinetic energy that is generated by the movement of an object as it is traveling by wheels on a road, and even more specifically from the vibrations that are experienced by a vehicle suspension system. A series of gears are used to amplify and transform the vertical motions of the vehicle suspension system into rotational motions of a shaft that is used to drive an alternator or a generator to produce electricity that can be utilized by an electric vehicle.

Description of Related Art

The prior art includes various examples of kinetic energy recovery systems that are specifically designed as components of a vehicle, and which are capable of generating electrical energy that may also be used by a vehicle.

One example of the prior art teaches a piston type of pump that is mounted between a vehicle frame and the suspension. The pump charges a high-pressure accumulator for driving hydraulic motors, e.g., power windows, power seats, alternator, etc.

In another embodiment, electricity is generated directly by a conductor moving with respect to a magnetic field as a result of the up and down motions of a vehicle suspension system.

In another invention, an air compressor mounted between the vehicle frame and suspension compresses air for storage in a pressure tank and is used to power pneumatic devices.

Another document in the prior art teaches an energy regeneration device that is disposed within a chassis spring of a suspension system that transforms kinetic energy generated by elongation and compression of the chassis spring to electrical energy by the piezo electrical effect. A suspension device of a vehicle is provided with one or more links for connecting to a vehicle body which is supported using a chassis spring and a shock absorber, and it may modulate horizontal movement of a vehicle body and a wheel by modulating rigidity and flexibility.

The system described above includes a transforming body configured to be compressed or elongated by a chassis spring of the suspension system, and an electric generating member that is electrically connected and configured to be compressed or elongated with the transforming body.

The transforming body is disposed between coils of the chassis spring of the Suspension system. The electric generating members are aligned between adjacent pitches of the coils so that the electric generating members are compressed or elongated by relative movements of the coils.

The energy generation system also includes a rectifier that is electrically connected with the electric generating members through the connector and rectifies an electric current made by the electric generating members, where the electric generating member is a piezoelectric element.

What is apparent from the prior art is that there seem to be many different ways of capturing the kinetic energy of movement of a vehicle suspension system and transforming it into usable mechanical and/or electrical energy.

However, the prior art appears to suffer from various drawbacks including, but not limited to, not generating a significant amount of energy, not generating energy rapidly, and being too fragile to work consistently in the environment in which they operate because of operating conditions of the road.

Accordingly, it would be an advantage over the prior art to provide a durable method of converting mechanical or kinetic energy into electrical energy in sufficiently large quantities to provide significant benefits to an electric or partially electric vehicle. It would be a further advantage to create a two-step process, wherein a first step is to mechanically convert linear motion to rotational motion, and a second step is to more efficiently convert the rotational motion to electrical energy.

BRIEF SUMMARY

The present invention is a system and method for recovering the kinetic energy created by movement of a vehicle frame relative to a vehicle suspension to generate electrical energy that may be utilized on-the-fly or stored in order to provide power to an electric vehicle, wherein an embodiment for a regenerative energy system uses a plurality of gear assemblies to convert linear up-and-down movement of the vehicle to rotary motion that is then amplified in rotational speed by a gear reduction system to cause rotational movement of a shaft of one or more generators in a single rotational direction to thereby generate electricity that may be utilized directly by electrical motors or stored in batteries or supercapacitors.

In a first aspect of the invention, it is an object of the present invention to provide a method and system of recovering the kinetic energy associated with the movement of a vehicle frame relative to the vehicle suspension to generate electrical energy that may be applied directly to an electrical motor or stored for later use.

In a second aspect of the invention, a rack and pinion system may be used to mechanically convert linear motion to rotational motion.

In a third aspect of the invention, the rotational motion may be directed to a generator or an alternator to thereby enable rotational motion to generate electrical energy that may be used at that moment, stored for future use, or both.

In a fourth aspect of the invention, the electrical energy generated by the embodiments of the invention may be stored so that it may be used by a vehicle that at least partially uses electrical motors to power the motion of the tires.

In a fifth aspect of the invention, the small up-and-down movements of the vehicle are magnified through one or more gears in order to convert the small movements into the turning of gears that directly rotate a shaft of an alternator or generator.

These and other embodiments of the present invention will become apparent to those skilled in the art from a consideration of the following detailed description taken in combination with the accompanying drawings.

DETAILED DESCRIPTION

Figure 1:
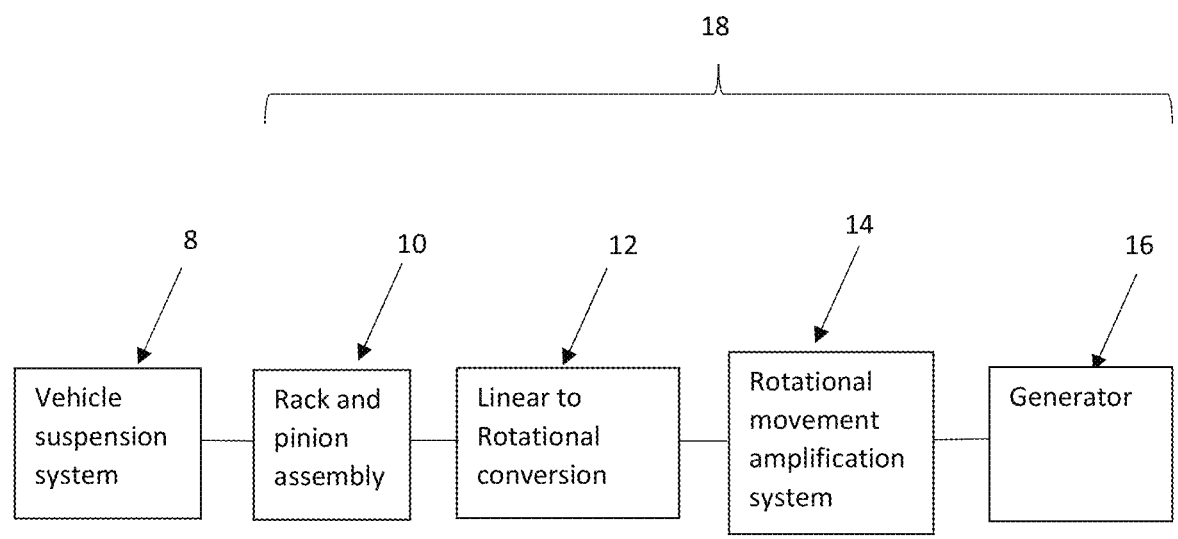
FIG. 1 is a block diagram of the components of the embodiments of the invention.

Reference will now be made to the drawings in which the various embodiments of the present invention will be discussed so as to enable one skilled in the art to make and use the invention. It is to be understood that the following description illustrates embodiments of the present invention and should not be viewed as narrowing the claims which follow.

It is first useful to understand the source of kinetic energy of the embodiments of the invention. The source of kinetic energy is motion that is typically in an upward and downward direction that is constantly repeating. The motion may not be constant but is rather a continuous series of random events that are dependent upon irregularities in the surface of a road being traveled upon by the vehicle. Everyone who travels by car is aware of the constant and typically small bounces of a vehicle while driving. It is these motions that are harnessed to drive the shaft of an alternator or generator. Thus, the present invention is capable of continuously capturing energy from repetitive motions of a vehicle while moving.

In the embodiments of the present invention, kinetic energy is captured from the motion of wheels that is perpendicular to the roadway. A vehicle may be described as having a cabin for passengers and cargo, a frame on which the cabin rests, a plurality of wheels, and a suspension system that is disposed between the wheels and the frame that cushions the movement of the cabin as the wheels travel on the road.

A vehicle's suspension system may be a protective lattice of shock-absorbing components such as springs and shock absorbers. A vehicle's suspension system helps ensure that a drive is safe and smooth by absorbing the energy from various road bumps and other kinetic impacts on the wheels. Furthermore, it helps the wheels stay in contact with the road by increasing tire friction.

While the embodiments of the invention are focused on capturing energy from the motion of a vehicle, it should be understood that the principles apply to capturing energy from any source of repetitive motion. There is also no limit on the type of motion that may be converted and is therefore not limited to an up-and-down motion.

A practical application of the first embodiment invention is directed to the movement of a vehicle. The job of a vehicle suspension is to maximize the friction between tires and a road surface, to provide steering stability with good handling, and to ensure the comfort of the passengers. If a road were perfectly flat with no irregularities, suspensions would not be necessary. However, roads are far from flat. Even freshly paved highways have subtle imperfections that can interact with the wheels of a vehicle. These imperfections apply forces to the wheels. All forces have both magnitude and direction. Thus, a bump in the road causes the wheel to move up and down perpendicular to the road surface and the direction of travel. The magnitude of the force depends on whether the wheel is striking a large bump or a small one and the velocity of the wheel. Regardless, the wheel experiences a vertical acceleration as it passes over any roadway imperfection.

Without an intervening structure, all of the wheel's vertical energy is transferred to the vehicle frame which moves in the same direction. In such a situation, the wheels may even lose contact with the road. Then, under the downward force of gravity, the wheels may slam back into the road surface.

Road isolation refers to the vehicle's ability to absorb or isolate road shock from the passenger compartment, thereby allowing the vehicle body to ride undisturbed while traveling over rough roads. The suspension system absorbs energy from road bumps and dissipates the energy without causing undue oscillation in the vehicle.

The suspension system of a vehicle is actually part of the chassis, which includes all of the important systems located beneath the vehicle's body. These systems include the frame, the suspension system, the steering system, and the wheels. The frame supports the vehicle's motors and body which are, in turn, supported by the vehicle suspension system. The vehicle suspension system supports weight, absorbs and dampens shock, and helps maintain tire contact with the roadway. The steering system enables the driver to guide and direct the vehicle. The tires and wheels make vehicle motion possible by way of friction with the road. Whether loosely sprung or tightly sprung, the suspension system of any vehicle is constantly moving relative to the frame.

Unless a dampening structure is present, a vehicle spring will extend and release the energy it absorbs from a bump at an uncontrolled rate. The spring will continue to bounce at its natural frequency until all of the energy originally put into it is used up. A suspension system built on springs alone would make for an extremely bouncy ride and, depending on the terrain, an uncontrollable vehicle. The shock absorber controls unwanted spring motion through a process known as dampening. Shock absorbers slow down and reduce the magnitude of vibratory motions by turning the kinetic energy of suspension movement into heat energy that can be dissipated through hydraulic fluid.

The regenerative energy system of the present invention generates useful energy from the up-and-down motion of a vehicle suspension system caused by roadway irregularities as the vehicle travels down the road.

FIG. 1 is a block diagram of the components of a first embodiment of the present invention. As will be explained, the first embodiment is able to capture the kinetic energy from both the upward and the downward motion of the vehicle suspension system 8.

In the block diagram view in FIG. 1, a rack and pinion assembly 10 may be coupled to the vehicle suspension system 8. The rack and pinion assembly 10 is then coupled to a linear motion to rotational movement conversion system 12 which is in turn coupled to a rotational movement amplification system 14. The rotational movement amplification system 14 is then coupled to an alternator or generator 16 for generating electricity. The combination of the rack and pinion assembly 10, the linear to rotational movement conversion system 12, the rotational movement amplification system 14, and the alternator 16 may be referred to as the regenerative energy system 18.

The rack and pinion assembly 10 is utilized to convert up-and-down linear motion to horizontal linear motion, and then horizontal linear motion is converted to rotational motion using the linear to rotational movement conversion system 12. The rotational movement amplification system 14 is then utilized to amplify the rotational motion to thereby generate electricity using the generator 16. While the first embodiment shows that the conversion of linear motion to rotational motion and then the amplification of the rotational motion is performed by separate components, it should be understood that these functions may also be combined in a single step or device. However, the first embodiment uses a simple system to transfer linear motion to a location in the vehicle where it can then be conveniently converted to rotational motion and finally coupled to a generator 16 to thereby generate electricity.

Figure 2:
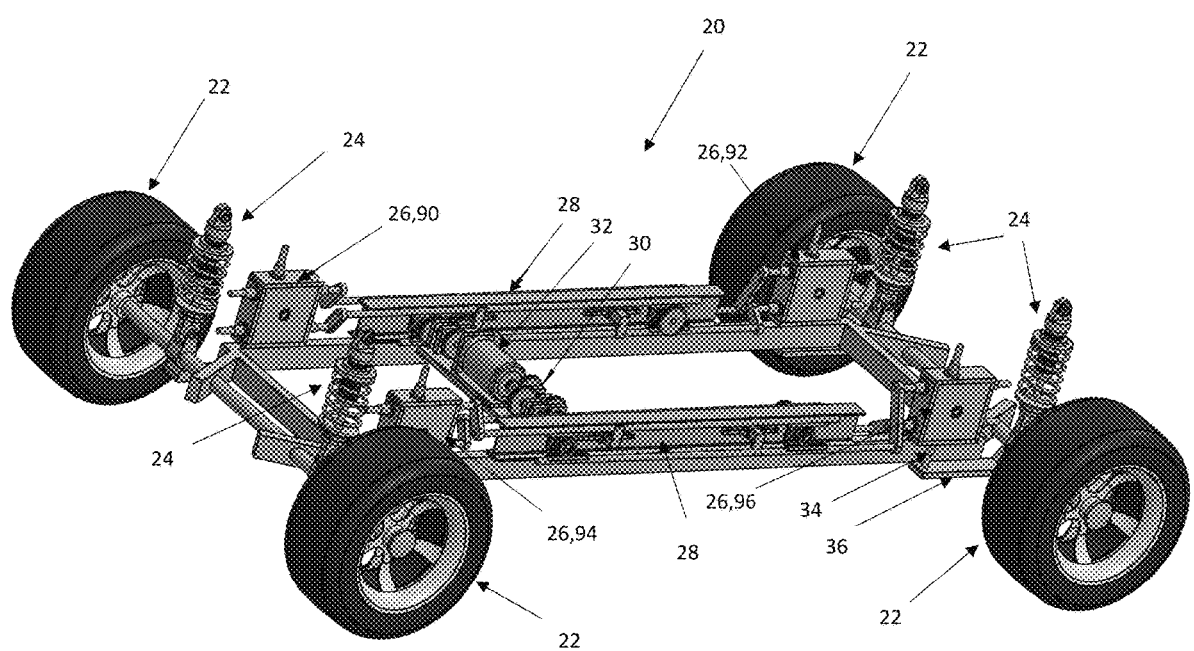
FIG. 2 is a perspective view of a first embodiment of the present invention.

FIG. 2 is a perspective view of a first embodiment of the present invention. FIG. 2 shows only a portion of a vehicle so that the elements of the first embodiment are more easily visible. What is shown is the vehicle chassis or frame 20 that provides support for the wheels 22, the vehicle suspension system 24, and a passenger compartment (not shown) that rests upon the vehicle suspension system. In the case of an electric vehicle, the vehicle will also have one or more electric motors (not shown) and a battery (not shown) and may also include a supercapacitor (not shown).

While a relatively small frame 20 is shown for the vehicle, this is for illustration purposes only. Accordingly, the frame 20 may be lengthened or shortened and disposed in larger or smaller vehicles. Thus, any vehicle having a vehicle suspension system or is a vehicle that is caused to move up-and-down as it travels may utilize the first embodiment of the invention. The vehicles that may utilize the first embodiment of the invention may include, but should not be considered as limited to, a compact car, a mid-size car, a large sedan, a cross-over vehicle, a sport utility vehicle, a pickup truck, a van, a bus, a utility vehicle, a truck, and a semi-truck. This list should be considered only as a sample of the vehicles that may utilize the first embodiment of the present invention and not a limiting factor.

While the frame 20, the wheels 22, and the vehicle suspension system 24 of the vehicle are shown in FIG. 2, also displayed are components of the first embodiment of the invention. These elements include a plurality of rack and pinion systems, each comprised of a plurality of rack and pinion gear boxes 26 and linear transformation racks 28 (or linear transformation system). The first embodiment is also comprised of a gear reduction system 30, and a double shaft alternator or generator 32 (only referred to as an "generator" hereinafter).

Subsequent drawings will illustrate the features of the first embodiment in greater detail, however, it is noted that the double shaft generator 32 is being rotated by gear reduction systems 30 on both sides, hence the need for the double shaft on the alternator. Thus, a gear reduction system 30 is disposed on each side of the double shaft generator 32 to ideally keep the alternator rotating in an uninterrupted manner whenever the vehicle is moving.

Alternatively, the generator 32 may include a single shaft and may be coupled to only one gear reduction system 30.

Accordingly, the design of the first embodiment is to create uninterrupted rotation of the double shaft of the generator 32 whenever the vehicle is traveling fast enough to cause up and down movement of the vehicle on the road. Uninterrupted rotation is desired because the shaft of the generator 32 needs to be turning in order to generate electricity. A typical alternator in a gas engine can generate electricity when the engine is idling and will rotate at around 800 rpm but will regularly rotate at 2400 rpm or higher. However, the generator 32 may rotate are far slower rpms to generate electricity. For example, electricity may be generated by the generator 32 with as little as 300 rpms.

However, it should also be understood that the generator 32 may periodically slow down or even stop when the vehicle is not moving fast enough to provide the needed movement of the vehicle suspension system.

The first embodiment may use an induction motor/generator. Alternatively, a second embodiment of the invention may use a motor having a permanent magnet. It is noted that the generators 32 of the embodiments of the invention may generate electricity when rotating as little as 300 rpm.

The first embodiment is designed with a reduction gear system 30 on each side of the generator 32 so that when the vehicle is traveling above 5 miles per hour, the double shaft of the generator 32 will rotate at a minimum of 1000 rpm.

It should be understood that these figures for rotation of the double shaft of the generator 32 are examples only, and that the shaft may rotate at lower or higher rpms and the generator 32 may still generate electricity to charge a battery or supercapacitor.

It is noted that either a generator or an alternator may be used in the first embodiment of the invention. Each device has its advantages and disadvantages, and the device is selected that is best suited to the application. For example, while both generators and alternators convert mechanical energy into electrical energy, alternator brushes generally last longer than those of generators, and alternators can fit into smaller spaces than generators. In addition, while alternators only generate AC voltage, a generator can produce both AC and DC voltage. A single vehicle may include both alternators and generators, only alternators, or only generators depending on the operational needs of the vehicle.

The first embodiment shown in FIG. 2 shows a rack and pinion gear box 26 at each corner of the frame 20. Using more than one rack and pinion gear box 26 in the vehicle enables more torque to be generated to thereby turn more than one generator 32 to generate electricity in the first embodiment. Thus, while the first embodiment shows a single generator 32, a plurality of generators 32 may be disposed in a single vehicle.

It is likely that a plurality of generators 32 operating in series may be used in a single vehicle in order to generate a typical 480 volts of an electric vehicle battery. For example, the generator of the first embodiment may be capable of generating 48 volts and thus an increase in voltage is clearly necessary. This may be accomplished by a combination of adding generators and electronically increasing the voltage. Thus, there are devices or circuits such as voltage regulators and transformers that enable a smaller voltage to be increased to a greater voltage sufficient for charging a battery or a supercapacitor, as is known to those skilled in the art.

The output of the generator 32 may also be discussed in terms of watts. A typical generator 32 may generate 1000 to 2500 watts. Therefore, two generators 32 operating in series may thus typically generate anywhere from 2 to 5 kW. However, these numbers should be considered only as examples and that selection of specific generators 32 may vary these results.

A last feature of the first embodiment shown in FIG. 2 is the point of contact between the rack and pinion gear box 26 and the frame 20 of the vehicle. Each of the rack and pinion gear boxes 26 includes a vertical rack gear bar 34 that may be in contact with a suspension plate 36 that is coupled to the suspension system 24. The movement of the suspension plate 36 causes the up-and-down movement of the vertical rack gear bar 34 of the rack and pinion gear box 26.

Figure 3:
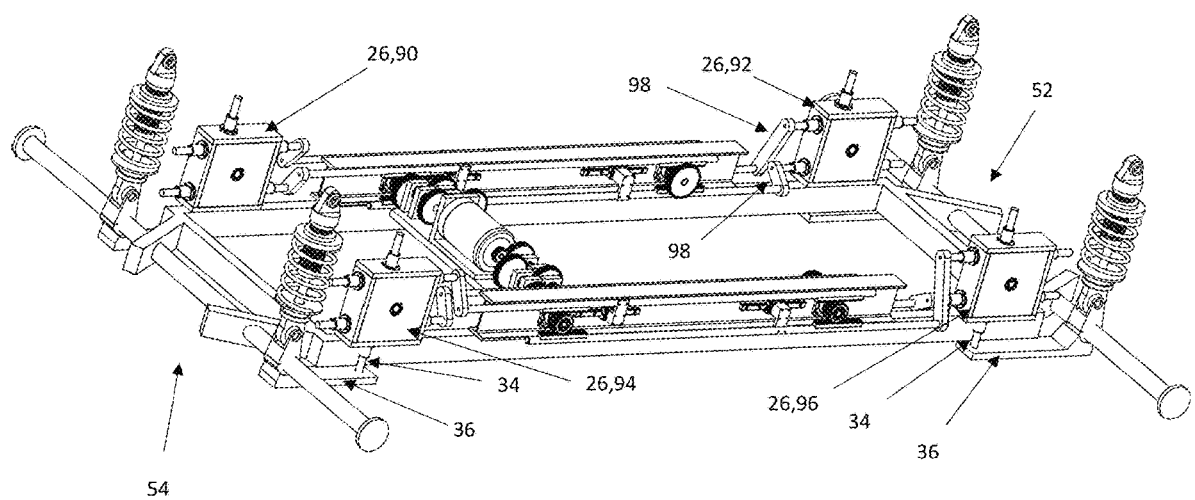
FIG. 3 is a perspective view of the first embodiment shown in FIG. 2 but without the wheels.

FIG. 3 is a perspective view of the first embodiment shown in FIG. 2 but without the wheels 22. This figure more clearly illustrates the suspension plate 36 that is contact with the vertical rack gear bar 34 of the rack and pinion gear box 26.

Figure 4A:
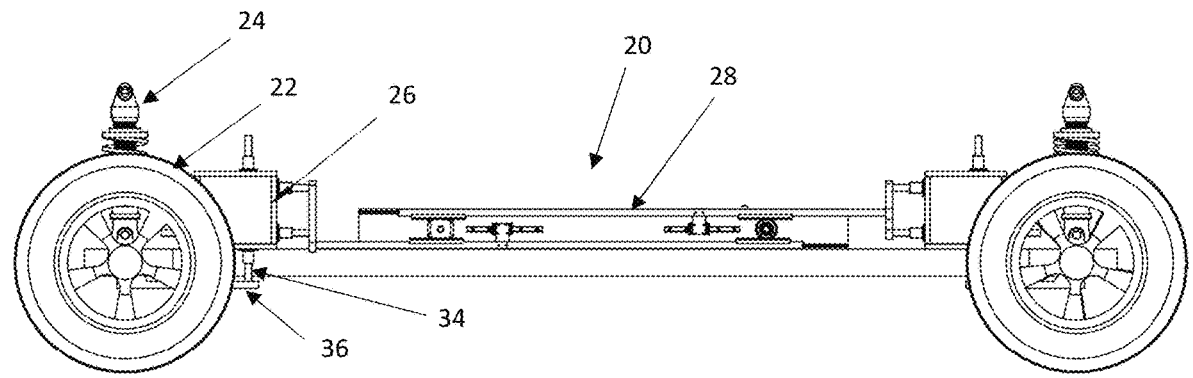
FIG. 4A is a profile view of the frame of the vehicle.

FIG. 4A is a profile view of the frame 20 of the vehicle. The figure also illustrates the wheels 22, the suspension systems 24, the gear and pinion boxes 26, the linear transformation racks 28, the vertical rack gear bars 34, and the suspension plates 36.

While a connection between the linear transformation racks 28 and the vertical rack gear bars 34 is shown as being the suspension plate 36, it is noted that any mechanical system that transfers movements of the suspension system 24 to the gear and pinion boxes 26 may be used and should be considered to be within the scope of the first embodiment.

Figure 4B:
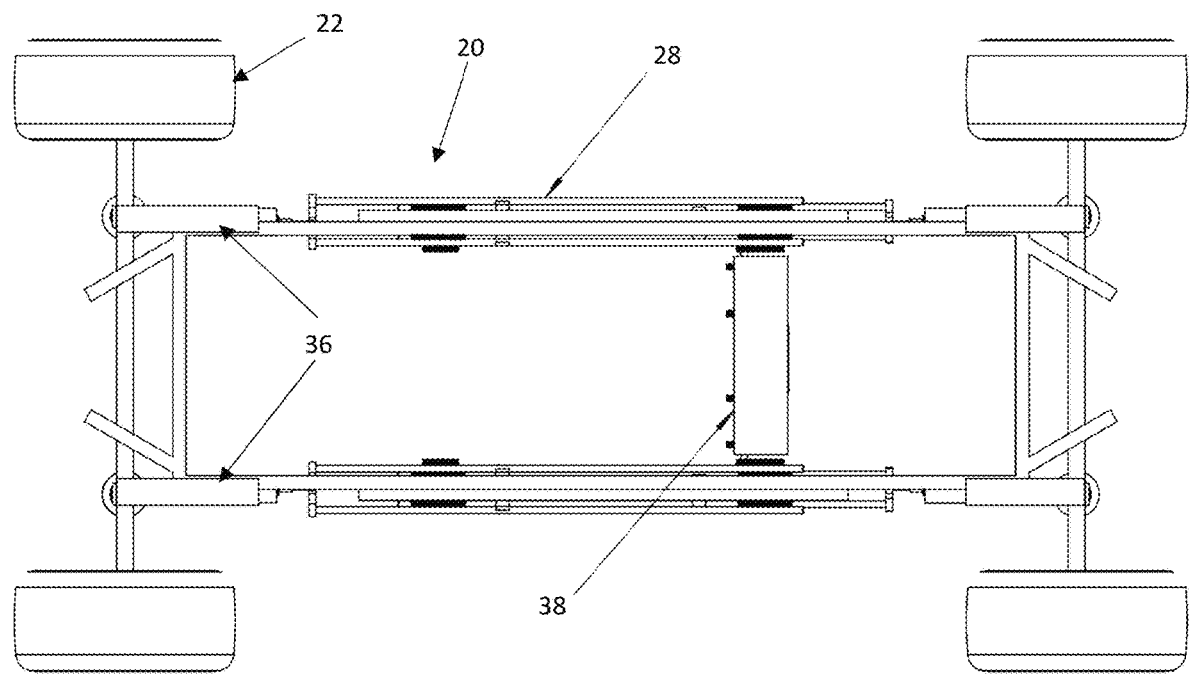
FIG. 4B is a bottom view of the frame of the vehicle.

FIG. 4B is a bottom view of the frame 20 of the vehicle. The figure also illustrates the tires 22, the linear transformation racks 28, the suspension plates 36, and a support plate 38 for the reduction gear system 30 (not shown) and the generator 32 (not shown) that are disposed on the other side.

FIG. 4B illustrates the relationship between the suspension plates 36 and the vertical rack gear bars 34. It is now useful to examine the detail inside the rack and pinion boxes 26 from which the vertical rack gear bars 34 are extended.

Figure 5:
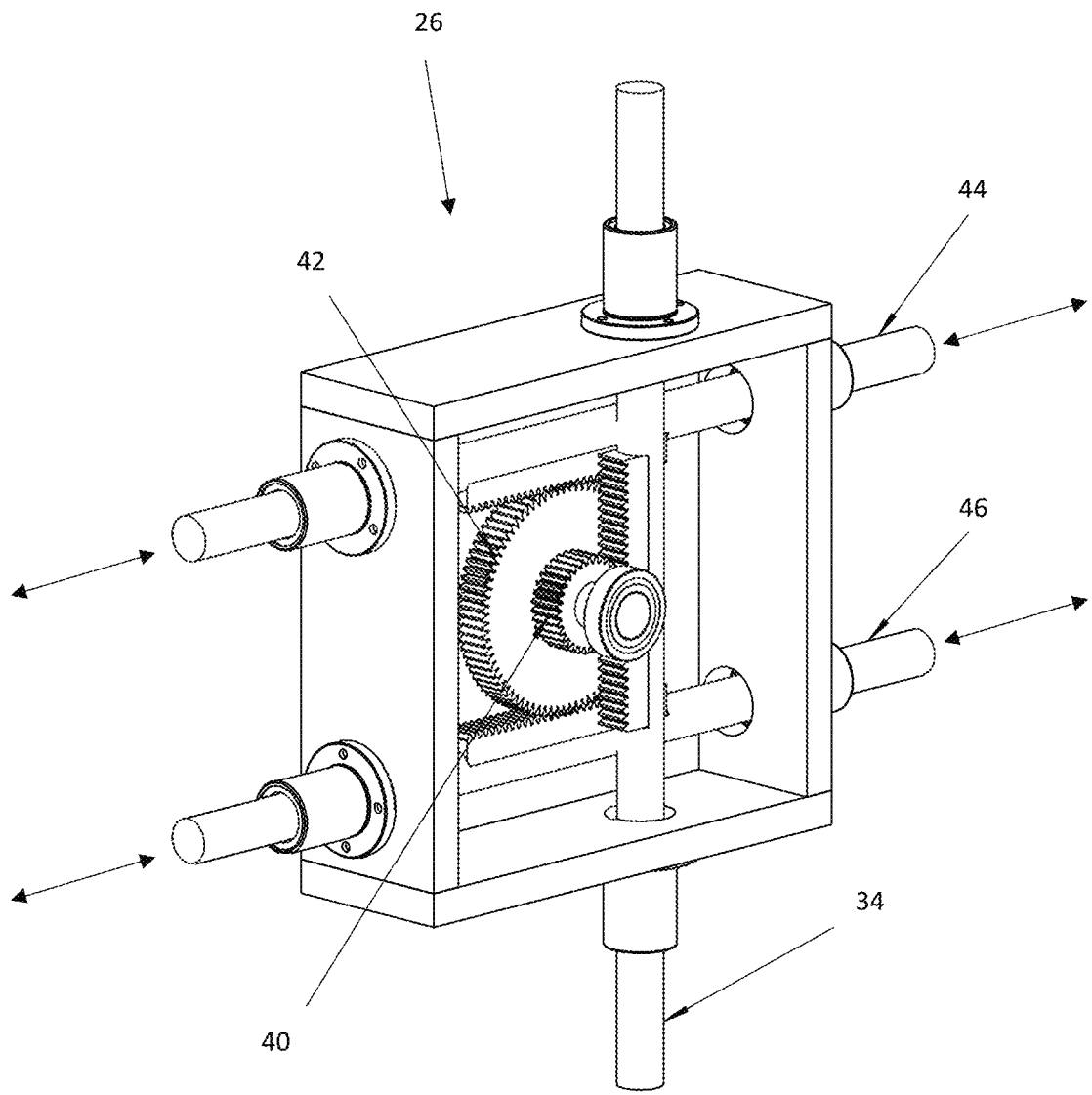
FIG. 5 is a perspective view of the inside of the rack and pinion box.

FIG. 5 is a perspective view of the inside of the rack and pinion box 26. The rack and pinion box 26 converts the vertical up-and-down motion of the vehicle suspension system 24 to a back-and-forth horizontal motion. The vertical rack gear bar 34 includes a portion with gear teeth that make contact with (engage) a small pinion gear 40. The vertical motion of the vertical rack gear bar 34 causes the small pinion gear 40 to rotate in relatively small increments back and forth. A large pinion gear 42 is directly coupled to the small pinion gear 40.

It should be understood that while the rack and pinion box 26 of the first embodiment shows the small pinion gear 40 and the large pinion gear 42, more gears could be provided to further amplify the movements of the vertical rack gear bar 34, and thus the utilization of the two gears 40, 42 should not be considered a limiting factor.

The larger diameter of the large pinion gear 42 magnifies the small movements of the small pinion gear 40. The large pinion gear 42 in turn engages the teeth of a top horizontal rack gear bar 44 and a bottom horizontal rack gear bar 46. The top horizontal rack gear bar 44 and the bottom horizontal rack gear bar 46 are thus caused to move back and forth in the direction of the arrows at the end of each horizontal rack gear bar 44, 46.

The greater diameter of the large pinion gear 42 is part of the overall system objective to magnify the small up-and-down vertical movements of the vehicle suspension system 24. The gear ratio between the large pinion gear 42 and the small pinion gear 40 may be modified as needed to achieve the desired rotation of the double shaft of the generator 32. In this illustration, the gear ratio is 1:2.5. If a third gear were added, the gear ratio may increase to 1:6.25, and so on.

After the rack and pinion box 26 has converted the vertical movements of the suspension system 24 to horizontal movements of the top horizontal rack gear bar 44 and the bottom horizontal rack gear bar 46, the next step is performed by the linear transformation rack 28. As shown in FIGS. 2 and 3, the rack and pinion gear box 26 is coupled to the linear transformation rack 28 by a top and a bottom rack gear bar 44, 46. More specifically, a coupling bar 98 is disposed between the top horizontal rack gear bar 44 and the bottom horizontal rack gear bar 46 of each of the rack and pinion gear boxes 26 and the top and bottom horizontal rack gear bars 44, 46 of the linear transformation rack 28.

Figure 6:
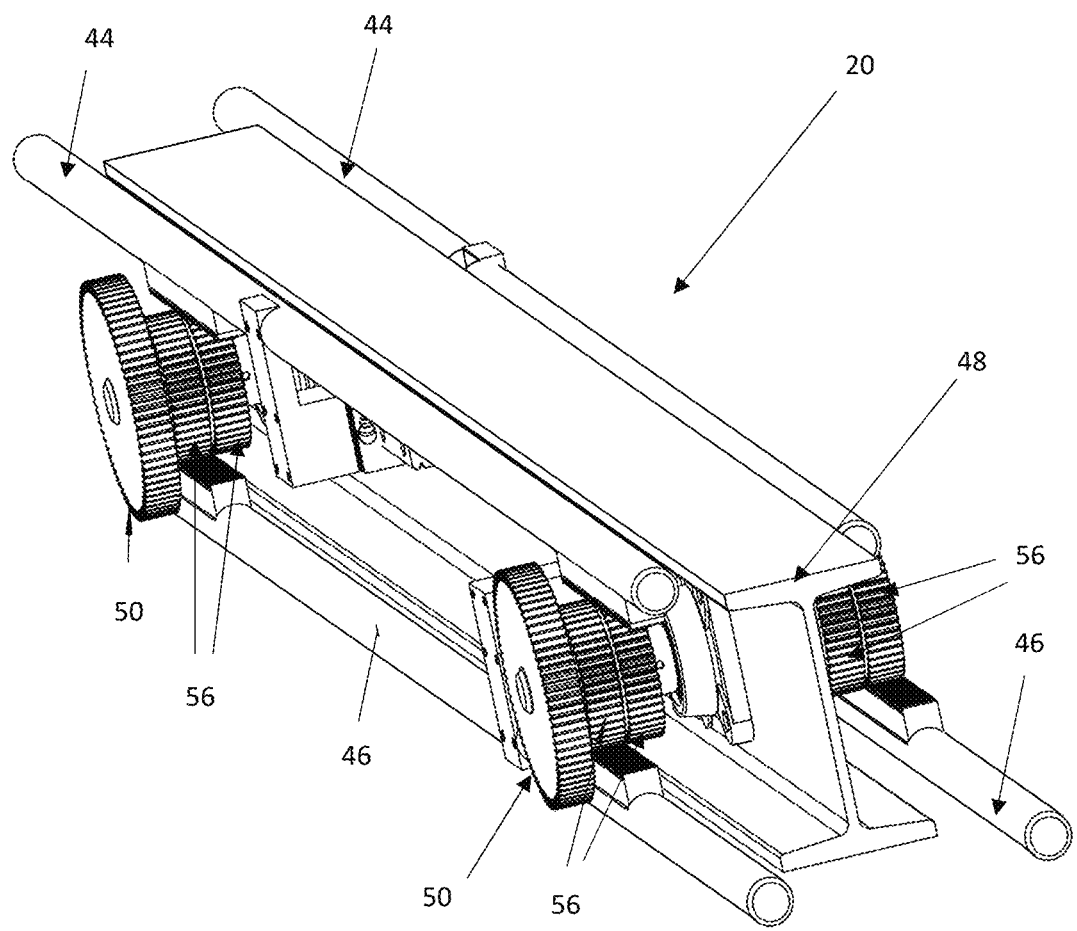
FIG. 6 is a closer perspective view of the linear transformation rack.

FIG. 6 is a closer perspective view of the linear transformation rack 28. A portion of the frame 20 of the vehicle is shown as the I-beam 48. The outer side of the frame 20 is shown on the far side. In other words, the inside of the frame 20 is shown on the left side of FIG. 6 and the outside of the frame is on the right side. The inside of the frame 20 is also recognized as being the only side of the linear transformation rack 28 that has an output gear 50. The linear transformation rack 28 is actually disposed on both sides of the I-beam 48 because in the first embodiment there is the front rack and pinion gear box 26 and a rear rack and pinion gear box 26. Thus, two rack and pinion gear boxes 26 are provided and with the appropriate connections.

As shown in FIG. 3, there is a rack and pinion gear box 26, 90 at the front end 54 and right side of the frame 20, and there is a rack and pinion gear box 26, 92 at the rear end 52 and right side of the frame. Likewise, there is a rack and pinion gear box 26, 94 at the front end 54 and left side of the frame 20, and there is a rack and pinion gear box 26, 96 at the rear end 52 and left side of the frame.

The manner in which the rack and pinion gear boxes 26 are coupled to the linear transformation racks 28 may also vary. In other words, there are four horizontal rack gear bars 44, 46 available to use.

As shown in FIGS. 2 and 3, the front and right side rack and pinion gear box 26, 90 is coupled to the top portion of the linear transformation rack 28. FIG. 6 shows that the top portion comprises the top horizontal rack gear bars 44. Similarly, the rear and right side rack and pinion gear box 26, 92 is coupled to the lower portion of the linear transformation rack 28. FIG. 6 shows that the lower portion comprises the bottom horizontal rack gear bars 46.

As noted above, this arrangement of connections between the rack and pinion gear boxes 26 to the linear transformation racks 28 is only one of four possible configurations. The second configuration is the front and right side rack and pinion gear box 26, 90 may be coupled to the inner portion of the linear transformation rack 28 while the rear and right side rack and pinion gear box 26, 92 may be coupled to the outer portion of the linear transformation rack. A third configuration is the front and right side rack and pinion gear box 26, 90 may be coupled to the upper and inside and to the lower and outside portion of the linear transformation rack 28 while the rear and right side rack and pinion gear box 26, 92 may be coupled to the upper and outside and to the lower and inside portion of the linear transformation rack. Finally, a fourth configuration is the front and right side rack and pinion gear box 26, 90 may be coupled to the upper and outside and to the lower and inside portion of the linear transformation rack 28 while the rear and right side rack and pinion gear box 26, 92 may be coupled to the upper and inside and to the lower and outside portion of the linear transformation rack.

These same four configurations of connections between the rack and pinion gear boxes 26 and the linear transformation racks 28 on the right side of the frame 20 may also be used on the left side of the frame.

Turning to FIG. 6, each side of the linear transformation rack 28 includes two pinion gears 56 that are coupled together coaxially. One of the pinion gears 56 is in contact with the top horizontal rack gear bar 44, while the other pinion gear 56 is in contact with the bottom horizontal rack gear bar 46. In this way, both the up and the down movement of the vehicle suspension system 24 is coupled to both of the pinion gears 56.

It is noted that the pinion gears 56 on both sides of the linear transformation rack 28 on opposites sides of the I-beam 48 are coupled together in coaxial alignment along an axle 84 (shown in FIG. 7), making a set of four pinion gears 56 that are all contributing to movement of the next step in the system, which is the gear reduction system 30.

An important issue becomes how the rack and pinion gear box 26 at the front end of the frame 20 and connected to one side of the linear transformation rack 28 does not interfere with the rack and pinion gear box 26 at the rear end of the frame that is coupled to the other side of the linear transformation rack. This important aspect of the first embodiment may be accomplished by using a one-way bearing disposed inside each of the pinion gears 56. The one-way bearing ensures that movement of the top horizontal rack gear bar 44 in one direction does not conflict with movement of the bottom horizontal rack gear bar 46 in an opposite direction. The pinion gears 56 are also coupled coaxially with the output gear 50 and are all configured to allow rotational movement of the output gear in only one direction.

Figure 7:
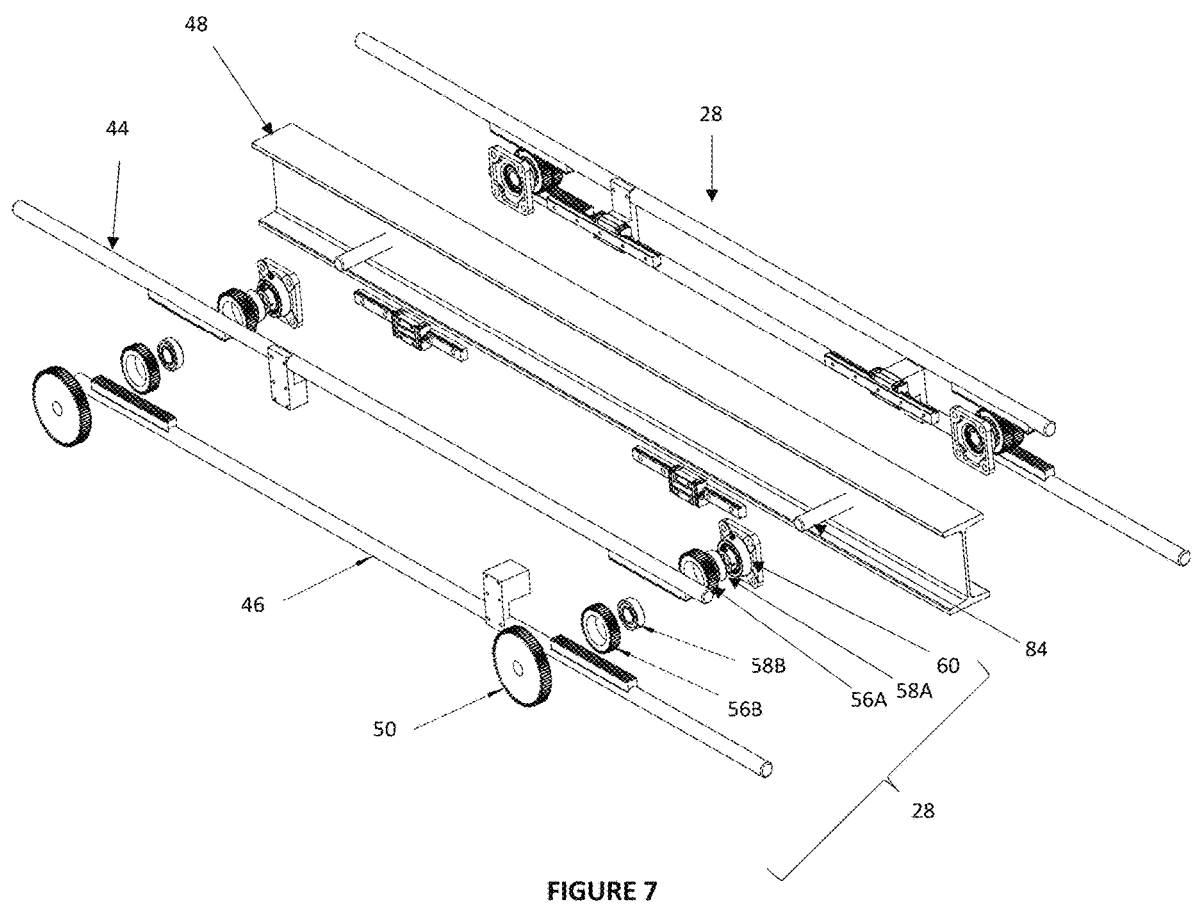
FIG. 7 is provided as an exploded perspective view of FIG. 6 so that the components of the linear transformation rack are more easily visible.

FIG. 7 is provided as an exploded perspective view of FIG. 6 so that the components of the linear transformation rack 28 are more easily visible. FIG. 7 shows only one half of the linear transformation rack 28 in an exploded view, and only the components at one end are labeled. The same components are shown at the opposite and non-labeled end.

As noted in FIG. 6 and now shown in FIG. 7, each side of the linear transformation rack 28 that are disposed on opposite sides of the I-beam 48 includes two pinion gears 56 that are coupled together. One of the pinion gears, now labeled 56A, is in contact with the top horizontal rack gear bar 44, while the other pinion gear, now labeled 56B, is in contact with the bottom horizontal rack gear bar 46. In this way, both the up and the down movement of the vehicle suspension system is coupled to both of the pinion gears 56A and 56B.

FIG. 7 also shows a first one-way bearing 58A that is disposed inside of the pinion gear 56A, and a second one-way bearing 58B that is disposed inside of pinion gear 56B. The directionality of the one-way bearings is selected such that the pinion gears 56A and 56B will only engage the output gear 50 and cause it to rotate in the same direction, but to rotate freely without engaging the output gear when rotating in an opposite direction. In turn, the rotating pinion gears 56A and 56B will thus only enable the output gear 50 to rotate in one direction. A mounting bracket 60 is also shown which attaches the pinion gears 56 and the one-way bearings 58 to the I-beam 48. It is also apparent that the pinion gears 56A and 56B, the one-way bearings 58A and 58B, the output gear 50 and the mounting bracket 60 are all disposed on the axle 84. The axle 84 is disposed through the I-beam 48.

It should be apparent that the labeled components are duplicated on the opposite end of the linear transformation rack 28. Likewise, the labeled components are also duplicated in position and function on the opposite side of the I-beam 48.

A first function of the linear transformation rack 28 is to thus transfer the back-and-forth motions of the top horizontal rack gear bars 44 and the bottom horizontal rack gear bars 46 to the rotational movement of the output gears 50. Another function is to obtain an increase in speed of the gears. However, it should be understood that as the speed of the gears increases, torque may be reduced. Eventually, the gears would be unable to overcome the torque in the system and would no longer turn. Accordingly, it is an aspect of the invention that the gear ratios of the entire regenerative energy system 18 are selected so that the speed of the gears is sufficient to obtain rotation of the generators 32 while still having sufficient torque to keep the gears moving. Thus, an aspect of the first embodiment is to obtain a balance between speed of the generators 32 and torque of the gears in every step of the regenerative energy system 18.

Another important aspect of the first embodiment is that the embodiment is scalable. For example, FIGS. 2 and 3 show that there are four rack and pinion gear boxes 26 on the frame 20. However, the first embodiment may also function with just a single rack and pinion gear box 26. Similarly, only a single linear transformation rack 28 could be used to provide a force for a single output gear 50. Nevertheless, by scaling up the number of rack and pinion gear boxes 26 and the number of linear transformation racks 28 and consequently the number of output gears 50, more generators 32 may be used in order to increase the total electrical generating capability of the regenerative energy system 18. So, it should be understood that depending on the size and the configuration of the vehicle frame 20, the total number of rack and pinion gear boxes 26 and linear transformation racks 28 and output gears 50 may be increased or decreased as desired.

Once four rack and pinion gear boxes 26 are being used, another method of using more generators is to provide more output gears 50 on the linear transformation racks 28. Again, it is necessary to balance the torque that is available to turn the gears versus the rotational speed that can be applied to the generators 32.

Alternatively, in a different embodiment of the invention, a plurality of generators 32 may be disposed in coaxial alignment, with the shafts coupled to each other so that the shafts of the generators 32 are rotated by one or more gear reduction systems 30.

The next step in the regenerative energy system 18 is to increase the speed of rotation of the output gear 50 of the linear transformation rack 28. It is again noted that there are two output gears 50 on each of the two linear transformation racks 28, making a total of four output gears 50 in the first embodiment.

Figure 8:
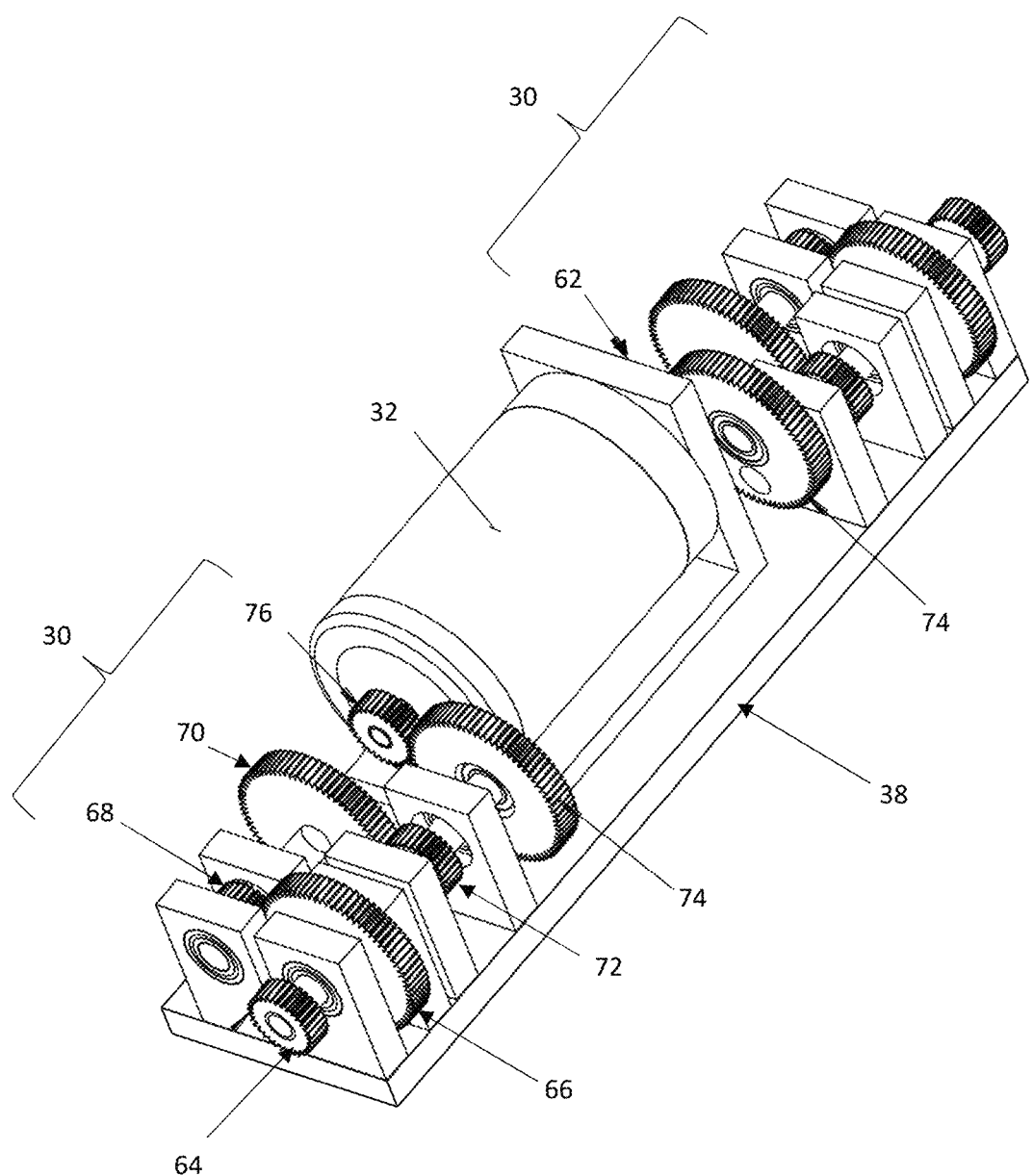
FIG. 8 is a perspective view of a single alternator disposed on the support plate.

The total number of output gears 50 may be modified because the system is scalable. However, FIG. 8 is a perspective view of a single generator 32 disposed on the support plate 38 (shown in FIG. 4B). The gear reduction system 30 on one side of the generator 32 is duplicated on the other side of the alternator. Thus, in this first embodiment, the generator 32 is being driven on both sides because it has a double shaft. The generator 32 is shown having a mounting plate 62 to stabilize the alternator on the support plate 38.

Before describing the operation of the gear reduction system 30, it is noted that the function of the gear reduction system is to increase the speed of rotation received from the output gear 50.

The output gear 50 from one of the linear transformation racks 28 will make contact with a first small input gear 64 of the gear reductions system 30. The small input gear 64 is coupled coaxially by a short drive shaft to a larger output gear 66. The larger output 66 gear makes contact with or engages a smaller input gear 68. The smaller input gear 68 is coupled coaxially by a short drive shaft to a larger output gear 70. The larger output gear 70 makes contact with or engages a smaller input gear 72. The smaller input gear 72 is coupled coaxially by a short drive shaft to a larger output gear 74 having a one-way bearing (not shown). Finally, the larger output gear 74 makes contact with or engages an input gear 76 on the generator 32. The use of the one-way bearings ensures that the gear reduction system 30 is only rotating the generator 32 in one direction.

The series of smaller input gears 64, 68, 72, and larger output gears 66, 70, 74, repeatedly use a gear ratio to increase the speed of rotation until reaching the input gear 76 on the alternator. It is important to recognize that the number of smaller input gears and larger output gears may be selected in order to achieve the desired speed of rotation of the final large output gear 74. As stated earlier, this speed of rotation is carefully balanced against the decrease in torque. The torque on the reductions gears 30 must be sufficient to enable the generator 32 to rotate and thereby generate electricity.

The exact gear ratio between each of the smaller input gears 64, 68, 72 and the corresponding larger output gear 66, 70, 74 may be adjusted as needed in order to obtain the desired speed of rotation and torque. In this first embodiment, the gear ratio from small gear to large gear has been selected to be 1:2.5. However, it should be understood that the gear ratio is only an example and may be modified as needed without affecting the scope of the claims.

It should also be understood that while there are three sets of smaller and larger gear pairs in each of the gear reduction systems 30, this number of gear pairs may also be modified without changing the function of the gear reduction systems.

Experimentation using the cited gear ratios and implementation of the first embodiment has yielded results regarding the operation of the first embodiment. For example, a movement of approximately 3 degrees of rotation of the small pinion gear 40 inside of the rack and pinion gear box 26, which is a very small movement of the gear, may be amplified by the rack and pinion gear box 26, the linear transformation rack 28, and the gear reduction system 30, resulting in a complete 360 degree rotation of the input gear 76 of the generator 32.

Another observation is that the various gears of the first embodiment have a surprising amount of inertia once the system is operating and generating electricity. This momentum of the various gears of the rack and pinion gear boxes 26, the linear transformation systems 28 and the gear reduction system 30 enable the system to continue to rotate the generator 32 even when the vehicle travels on smooth segments of the road and the vehicle slows down.

A final observation that is useful for the first embodiment is that while spur gears may be used in the implementation of the first embodiment that is shown in the figures, one or more gears may be replaced with a different type of gear. For example, planetary gears may be used to replace some or all of the spur gears of the regenerative energy system 18. The embodiments may also use a mixture of spur and planetary gears.

The two main parameters that are commonly associated with gear motors are torque and speed. When it comes to torque and speed, a planetary gear system may be more effective in high speed, high torque applications. The multiple contact points between the gears of a planetary gear head are the reason for its effectiveness in these conditions.

However, the less complex construction of a spur gear may result in not being able to hold as much of a load as their planetary counterpart. As the spur gear speed increases, it will produce a fair amount of noise without proper internal lubrication. The ability to add multiple stages and have high gear reduction ratios allows spur gear motors to handle higher loads if needed.

In planetary gear systems the gear lubrication tends to stay within the teeth of the gears whereas, whereas with spur gear systems, the lubrication tends to disperse from the gears at higher speeds.

Another gear system that may be implemented in the first embodiment of the invention is that of double helical gears. Some advantages of using such gears may be increased torque and a reduction in noise.

Figure 9A:
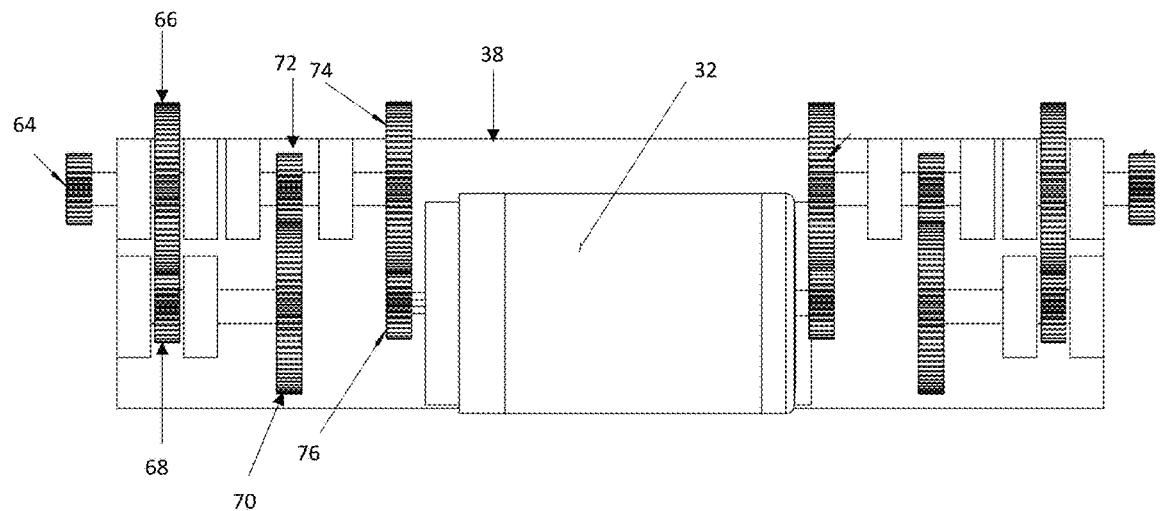
FIG. 9A is a top view of the gear reductions systems and the alternator with the small input gears and the large output gears.

FIG. 9A is a top view of the gear reductions systems 30 and the generator 32 with the smaller input gears 64, 68, 72, and the larger output gears 66, 70, 74.

Figure 9B:
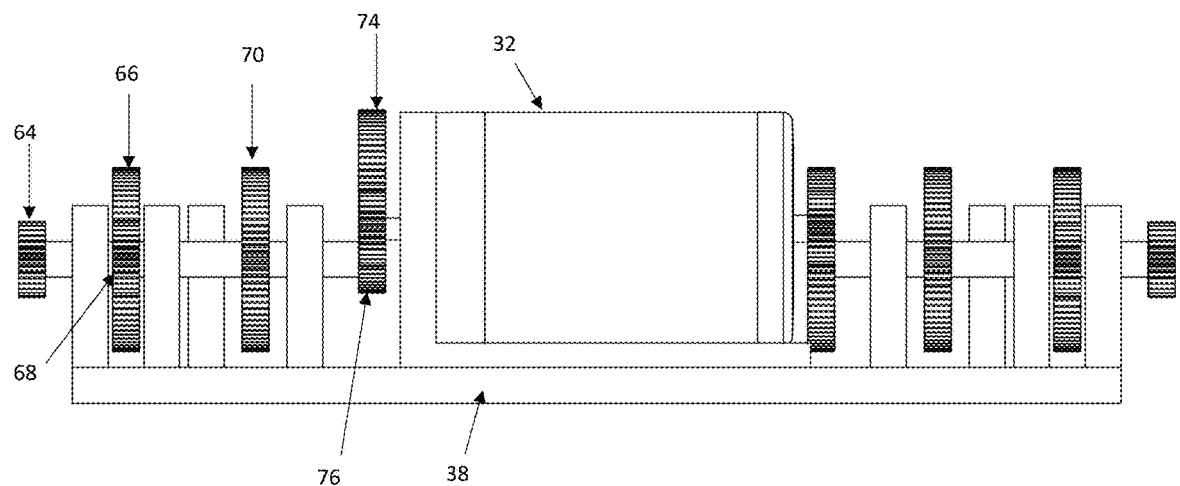
FIG. 9B is a profile view of the gear reductions systems and the alternator with the small input gears and the large output gears.

FIG. 9B is a profile view of the gear reductions systems 30 and the generator 32 with the smaller input gears 64, 68, 72 (not shown because it is obscured by larger output gear 70), and the larger output gears 66, 70, 74.

Figure 10:
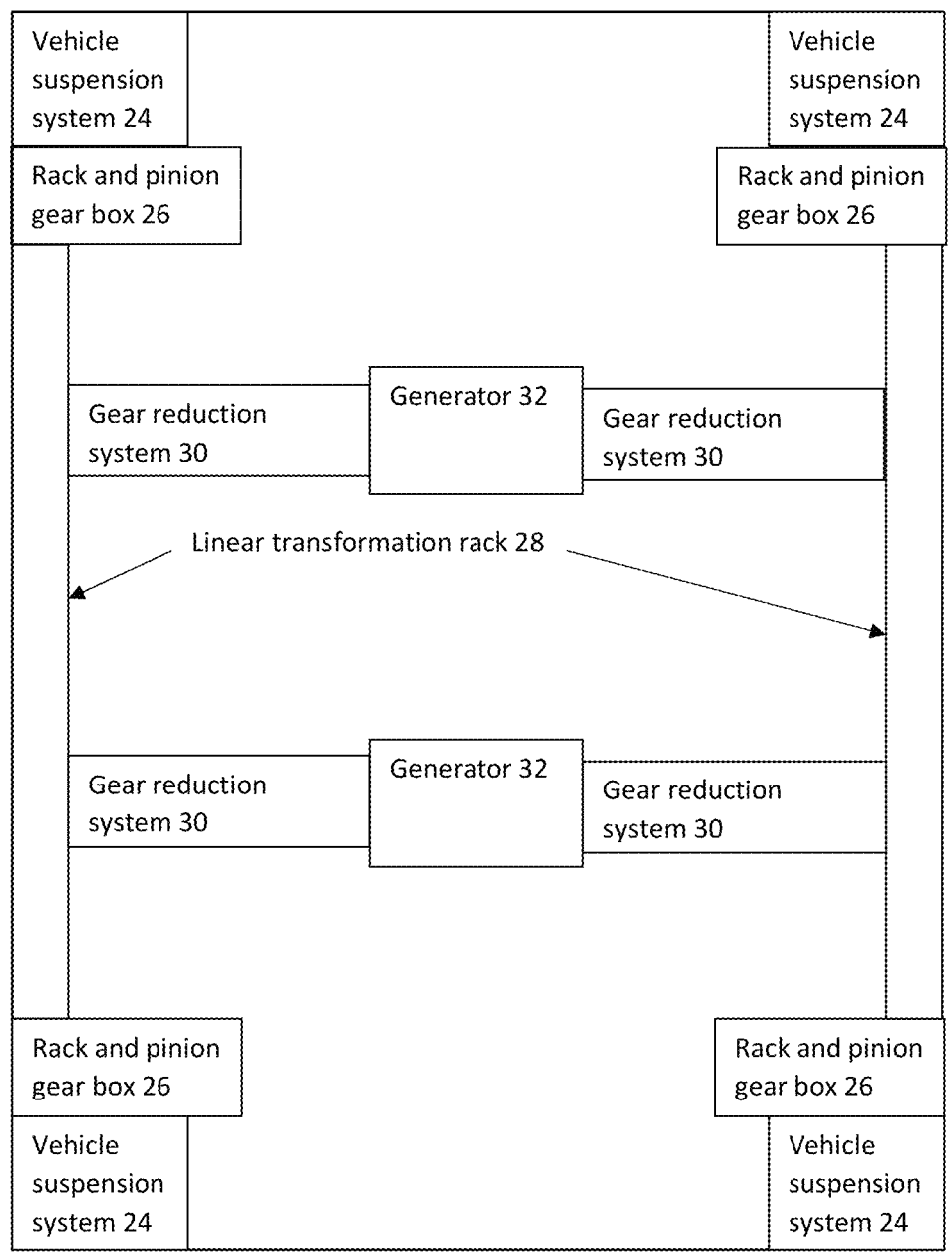
FIG. 10 is a block diagram that summarizes the various stages of the regenerative energy system.

The FIGS. 1 through 9 above show in detail the various stages of the regenerative energy system 18. FIG. 10 is a block diagram that summarizes the various stages of the regenerative energy system 18 in a format that is useful in understanding the first embodiment of the invention. The blocks of the various components are arranged in a layout of their physical position in relation to the vehicle frame and each other.

If there is sufficient torque in the regenerative energy system 18, then additional gear reduction systems 30 and generators 32 may be added. This may be accomplished by adding additional pinion gears 56 and output gears 50 on the linear transformation racks 28. Accordingly, the scalability of the first embodiment is important.

Figure 11:
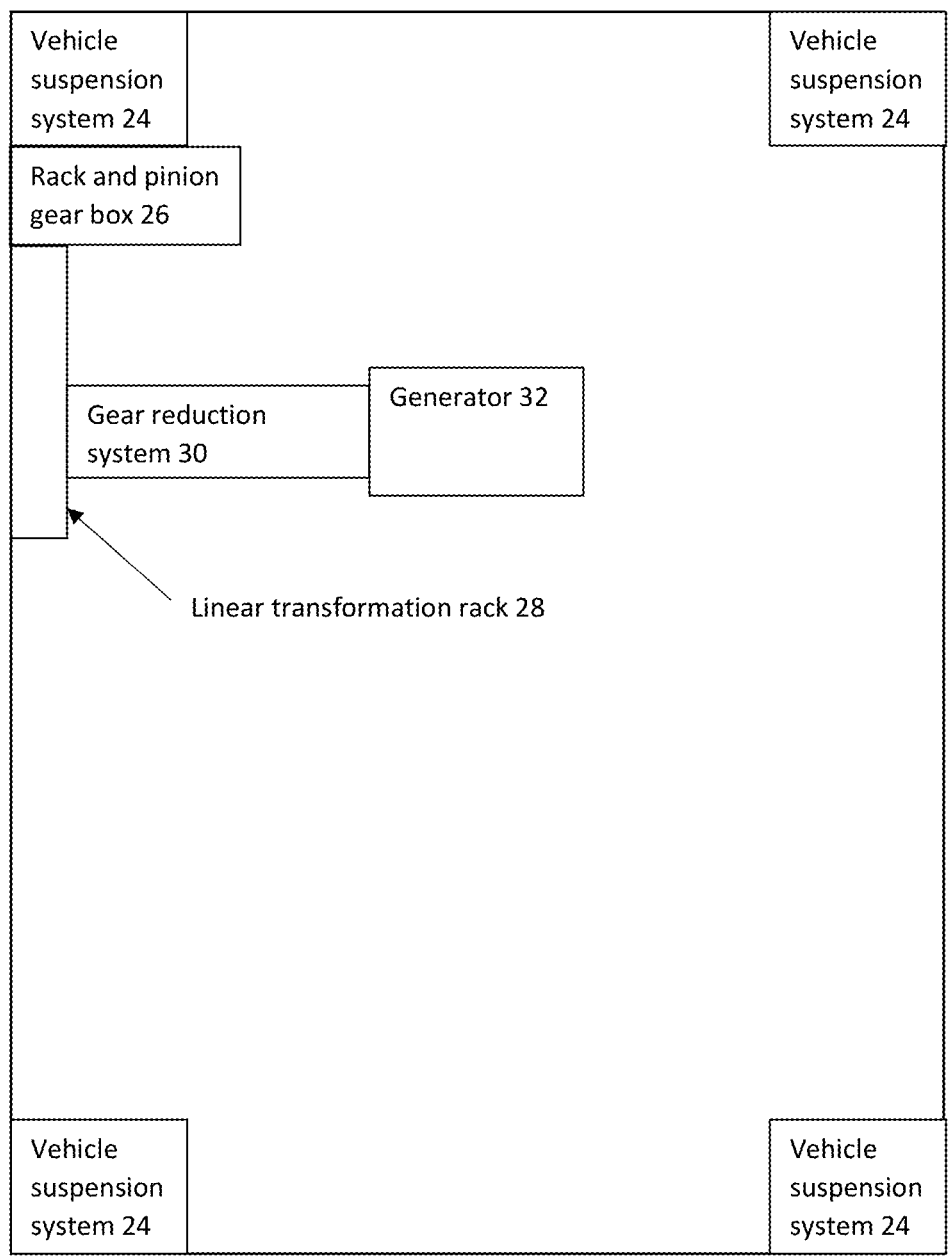
FIG. 11 is a block diagram that is provided as an example of the scalability of the present invention.

FIG. 11 is a block diagram that is provided as an example of the scalability of the present invention. Thus, in an alternative embodiment, a single rack and pinion gear box 26, a single linear transformation rack 28, a single gear reduction system 30 and a single generator 32 are implemented.

Similarly, the embodiment shown in FIG. 11 may be modified to include more components to achieve the desired electrical output of the regeneration energy system 18.

It is noted that while the first embodiment includes a rack and pinion system that only converts vertical motion to horizontal motion, and then utilizes a linear transformation system to convert horizontal motion to rotational motion for the gear reduction system, it is possible for the rack and pinion system to convert vertical motion directly to rotational motion. It is only because of the need to transfer the motion of the rack and pinion system to a location that is further away so that there is more room for the gear reduction system and the alternator that makes the linear transformation rack a necessary part of the design. However, it may be possible to eliminate the need for the linear transformation system if the gear reduction system can be adjacent to the rack and pinion system. Accordingly, in an alternative embodiment, the rack and pinion system may direct convert vertical motion to rotational motion which is then directly coupled to the gear reduction system.

Figure 12:
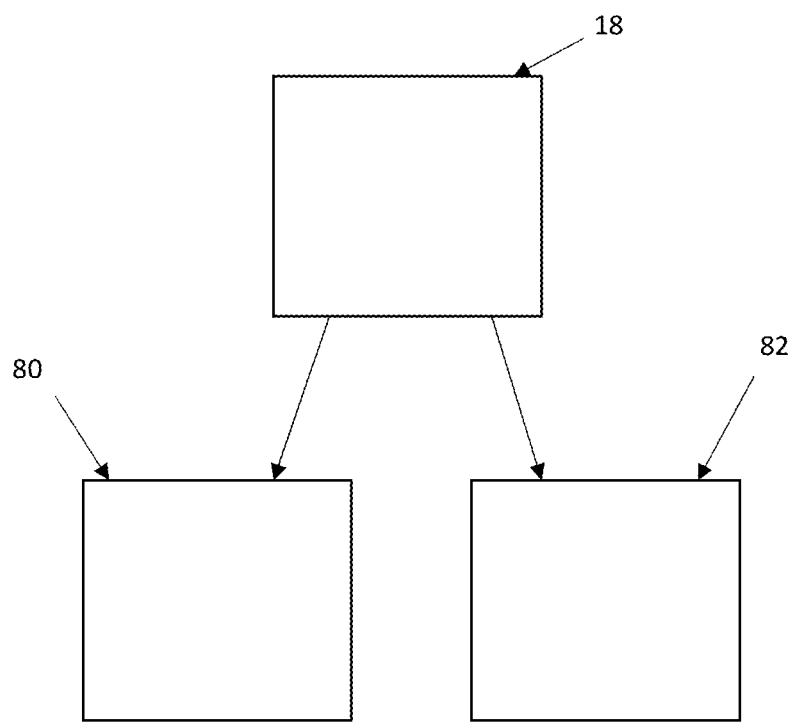
FIG. 12 is a block diagram that shows that the electrical energy generated by the regenerative energy system may be stored in a battery or a supercapacitor.

FIG. 12 is used to illustrate that in another aspect of the embodiments of the invention, a specific utilization of the electrical energy that is being generated by the embodiments of the invention may be shown. Specifically, it is another aspect of the invention that the electrical energy generated by the regenerative energy system 18 may be stored in a supercapacitor 80 instead of in a battery 82 of the vehicle. Alternatively, the electrical energy may be directed only to the battery 82. In another alternative embodiment, the electrical energy may be directed to both the supercapacitor 80 and the battery 82.

The energy stored in the supercapacitor 80 may be accessed when additional power is required such as when a vehicle is trying to ascend a hill. Accordingly, it may be recommended that the electrical energy stored in the supercapacitor 80 be accessed when trying to climb a hill because the supercapacitor may be drained more rapidly than energy from the battery 82 and may thus assist a vehicle to maintain speed or to even accelerate up a hill. In other words, the supercapacitor 80 may be capable of a faster rate of discharge to a motor as compared to the battery 82, and thus may be called upon for bursts of energy when it is needed instead of a steady flow.

Another aspect of the embodiments of the invention that should be understood regarding the generator 32 of the regenerative energy system 18. While a stock alternator may be used, the generator 32 may also be a customized part that generates a greater amount of voltage than standard vehicle generators. Furthermore, the generator 32 may be replaced with an alternator, a stepper motor, or a brushless motor. What is important is that the function of the generator 32 be provided in the regenerative energy system 18.

While the embodiments of the invention above are directed to a regenerative energy system 18 that is coupled to a vehicle suspension system, it should be understood that there are other sources of movement that may be utilized to generate electricity using a similar regenerative energy system.

The embodiments above are directed to using a regenerative energy system to generate electricity from the movements of a vehicle while traveling. While vehicles with four wheels have been suggested as benefiting from the invention, it should be understood that the present invention may also be implemented on a vehicle with more than four and less than four wheels. Furthermore, the present invention is not limited to vehicles with wheels or with motors.

For example, the movement of trailers on a road may also be used to generate electricity. Consider semi-trucks and the trailers that they haul. These trailers may also have suspension systems and experience all of the movements of the road. Thus, the embodiments of the present invention may be implemented on trailers. Electricity that is generated may be stored in batteries or supercapacitors in the trailers, or the electricity may be transferred via power cables to the battery or supercapacitor of an electrically powered semi-truck. It is envisioned that an electrically powered semi-truck could substantially extend its driving range if the semi-truck and its trailer or trailers were all equipped with the embodiments of the invention.

Figure 13:
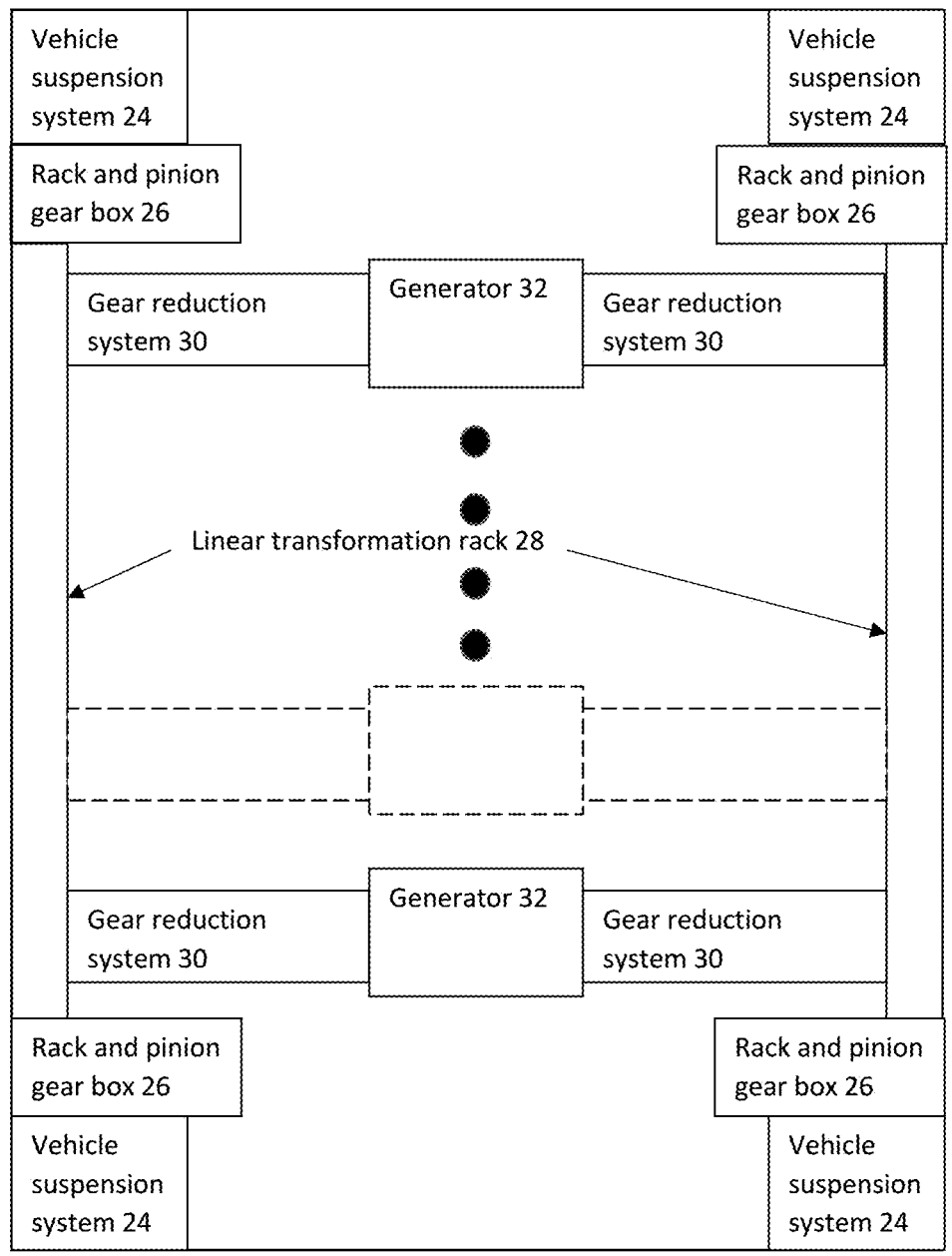
FIG. 13 is a block diagram that is provided as an example of the scalability of the present invention as implemented on a trailer or long-body electric vehicle such as a bus.

FIG. 13 is a block diagram of an alternative embodiment showing how the long body of a trailer or long-bodied vehicle such as a bus might implement the present invention. This figure shows that a plurality of gear reduction systems 30 and generators 32 are disposed along the length of the linear transformation racks 28.

Furthermore, an electrically powered semi-truck or larger vehicle such as a bus may have a problem driving on hills. The embodiments of the present invention may be used to charge supercapacitors as well as batteries. A supercapacitor may be capable of discharging electricity at a faster rate than a battery. Thus, a semi-truck hauling one or more trailers may be able to draw on large amounts of electricity from a supercapacitor in order to maintain speed or even accelerate up a hill.

In summary, a regenerative energy system is configured to capture energy from a moving vehicle, said system comprising a vehicle suspension system that dampens movements of the moving vehicle as it travels, a rack and pinion system that is coupled to the suspension system, wherein the rack and pinion system converts vertical motion of the vehicle suspension system to horizontal motion, a linear transformation system coupled to the rack and pinion system, wherein the linear transformation system converts the horizontal motion of the rack and pinion system to rotational motion, a gear reduction system coupled to the linear transformation system, wherein the gear reduction system receives the rotational motion of the linear transformation system and amplifies the rotational motion, and a single shaft alternator coupled to the gear reduction system, wherein the alternator receives the amplified rotational motion and generates electricity therefrom.

Similarly, a method for generating electricity from a moving vehicle in a regenerative energy system is a method comprising the steps of 1) providing a vehicle suspension system that dampens movements of the moving vehicle as it travels, 2) providing a rack and pinion system that is coupled to the suspension system, 3) converting the vertical motion of the vehicle suspension system to horizontal motion using the rack and pinion system, 4) providing a linear transformation system coupled to the rack and pinion system, 5) converting the horizontal motion of the rack and pinion system to rotational motion using the linear transformation system, 6) providing a gear reduction system coupled to the linear transformation system, 7) amplifying the rotational motion receiving from the linear transformation system using the gear reduction system, 8) providing a single shaft alternator coupled to the gear reduction system, and 8) generating electricity from the alternator as the gear reduction system rotates the alternator.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A regenerative energy system configured to capture energy from a moving vehicle, said system comprising:
   a vehicle suspension system that dampens movements of the moving vehicle as it travels;
   at least two rack and pinion systems that are coupled to the suspension system, wherein the rack and pinion systems convert vertical motion of the vehicle suspension system to horizontal motion;

at least two linear transformation systems coupled to the rack and pinion systems, wherein the linear transformation systems convert the horizontal motion of the rack and pinion systems to rotational motion;

at least two gear reduction systems coupled to the linear transformation systems, wherein the gear reduction systems receive the rotational motion of the linear transformation systems and amplifies the rotational motion; and a single shaft alternator coupled to the gear reduction system, wherein the alternator receives the amplified rotational motion and generates electricity therefrom, and wherein the alternator is a double shaft alternator that may be coupled at both ends of the double shaft to the at least two gear reductions systems, wherein a first gear reduction system is coupled to a first end of the double shaft, wherein a second gear reduction system is coupled to a second end of the double shaft, and wherein the first and the second gear reduction systems are simultaneously able to rotate the double shaft.

2. The regenerative energy system as defined in claim 1 wherein the system is further comprised of a battery that is charged by the alternator.

3. The regenerative energy system as defined in claim 1 wherein the system is further comprised of a supercapacitor that is charged by the alternator.

4. The regenerative energy system as defined in claim 1 wherein the system is further comprised of a plurality of rack and pinion systems, a plurality of linear transformation systems, a plurality of gear reduction systems and a plurality of generators.

5. The regenerative energy system as defined in claim 4 wherein the gears in the plurality of rack and pinion systems, in the plurality of linear transformation systems, and in the plurality of gear reduction systems are selected from spur gears, planetary gears and double helical gears.

6. The regenerative energy system as defined in claim 1 wherein the at least two rack and pinion systems are further comprised of:

a large pinion gear coupled coaxially with a small pinion gear;

a vertical rack gear bar that is in contact with the vehicle suspension system and the small pinion gear, wherein the vertical up-and-down movements of the vehicle suspension system cause corresponding vertical up-and-down movements of the vertical rack gear bar, and corresponding rotational movements of the small pinion gear;

a top horizontal rack gear bar that is engaged with the large pinion gear;

a bottom horizontal rack gear bar that is engaged with the large pinion gear; and wherein rotational movements of the small pinion gear cause corresponding rotational movements of the large pinion gear, and horizontal movements of the top horizontal rack gear bar and the bottom horizontal rack gear bar.

7. The regenerative energy system as defined in claim 6 wherein the at least two linear transformation systems are further comprised of:

at least two pinion gears that are coupled together coaxially, wherein each of the at least two pinion gears include a one-way bearing disposed therein such that the at least two pinion gears are only engaged in one direction and rotate freely in an opposite direction;

an output gear that is coupled coaxially with the at least two pinion gears, wherein rotation of the at least two pinion gears cause rotation of the output gear, and wherein the output gear is caused to only rotate in the same direction as the at least two pinion gears; and wherein a first of the at least two pinion gears is engaged with the top horizontal rack gear bar of the rack and pinion system, and wherein a second of the at least two pinion gears is engaged with the bottom horizontal rack gear bar of the rack and pinion system.

8. The regenerative energy system as defined in claim 7 wherein the at least two gear reduction systems are further comprised of:

a first smaller input gear coupled coaxially to a first larger input gear;

a second smaller input gear coupled coaxially to a second larger input gear, wherein the first larger input gear engages the second smaller input gear;

a third smaller input gear coupled coaxially to a third larger input gear, wherein the second larger input gear engages the third smaller input gear; and wherein the third larger input gear engages at least one end of the double shaft of the alternator.

9. A method for generating electricity from a moving vehicle in a regenerative energy system, said method comprising:

providing a vehicle suspension system that dampens movements of the moving vehicle as it travels;

providing at least two rack and pinion systems that are coupled to the suspension system;

converting the vertical motion of the vehicle suspension system to horizontal motion using the rack and pinion systems;

providing at least two linear transformation systems coupled to the rack and pinion systems;

converting the horizontal motion of the rack and pinion systems to rotational motion using the linear transformation systems;

providing at least two gear reduction systems coupled to the linear transformation systems;

amplifying the rotational motion receiving from the linear transformation systems using the gear reduction systems;

providing a single shaft alternator coupled to the gear reduction systems;

increasing torque on the alternator by coupling the at least two gear reduction systems to the alternator, wherein a first gear reduction system is coupled to a first end of the alternator and wherein a second gear reduction system is coupled to a second end of the alternator; and simultaneously rotating the first end and the second end of the alternator to thereby increase performance of the alternator; and generating electricity from the alternator as the gear reduction systems rotate the alternator.

10. The method for generating electricity as defined in claim 9 wherein the method further comprises charging a battery using the electricity generated by the alternator.

11. The method for generating electricity as defined in claim 9 wherein the method further comprises charging a supercapacitor using the electricity generated by the alternator.

12. The method for generating electricity as defined in claim 9 wherein the method further comprises providing a plurality of rack and pinion systems, a plurality of linear transformation systems, a plurality of gear reduction systems and a plurality of generators to thereby increase torque on the alternator to increase performance of the alternator.

13. The method for generating electricity as defined in claim 12 wherein the method further comprises selecting gears in the plurality of rack and pinion systems, in the plurality of linear transformation systems, and in the plurality of gear reduction systems from spur gears, planetary gears and double helical gears.

14. The method for generating electricity as defined in claim 9 wherein the method further comprises:
providing a large pinion gear coupled coaxially with a small pinion gear;
providing a vertical rack gear bar that is in contact with the vehicle suspension system and the small pinion gear, wherein the vertical up-and-down movements of the vehicle suspension system cause corresponding vertical up-and-down movements of the vertical rack gear bar, and corresponding rotational movements of the small pinion gear;
providing a top horizontal rack gear bar that is engaged with the large pinion gear;
providing a bottom horizontal rack gear bar that is engaged with the large pinion gear; and
wherein rotational movements of the small pinion gear cause corresponding rotational movements of the large pinion gear, and horizontal movements of the top horizontal rack gear bar and the bottom horizontal rack gear bar.

15. The method for generating electricity as defined in claim 14 wherein the method further comprises:
providing at least two pinion gears that are coupled together coaxially, wherein each of the at least two pinion gears include a one-way bearing disposed therein such that the at least two pinion gears only rotate in a same direction;
providing an output gear that is coupled coaxially with the at least two pinion gears, wherein rotation of the at least two pinion gears cause rotation of the output gear, and wherein the output gear is caused to only rotate in the same direction as the at least two pinion gears; and
generating rotation of the output gear when a first of the at least two pinion gears is engaged with the top horizontal rack gear bar of the rack and pinion system and generating rotation of the output gear when a second of the at least two pinion gears is engaged with the bottom horizontal rack gear bar of the rack and pinion system.

16. The method for generating electricity as defined in claim 15 wherein the method further comprises:
providing a first small input gear coupled coaxially to a first large input gear;
providing a second small input gear coupled coaxially to a second large input gear, wherein the first large input gear engages the second small input gear;
providing a third small input gear coupled coaxially to a third large input gear, wherein the second large input gear engages the third small input gear; and
rotating at least one end of the double shaft of the alternator with the third large input gear when the first small input gear is rotated by the output gear of the linear transformation system.

\* \* \* \* \*